United States Patent
Kloppenburg et al.

(10) Patent No.: US 9,079,981 B2
(45) Date of Patent: Jul. 14, 2015

(54) NANOSTRUCTED POLYMERS ON THE BASIS OF CONJUGATED DIENES

(75) Inventors: Heike Kloppenburg, Düsseldorf (DE); Thomas Groß, Wülfrath (DE); Alex Lucassen, Dormagen (DE); Dave Hardy, Dormagen (DE)

(73) Assignee: LANXESS DEUTSCHLAND GMBH, Cologne, DE (US)

( * ) Notice: Subject to any disclaimer, the term of this patent is extended or adjusted under 35 U.S.C. 154(b) by 1038 days.

(21) Appl. No.: 12/672,697

(22) PCT Filed: Aug. 7, 2008

(86) PCT No.: PCT/EP2008/060416
§ 371 (c)(1),
(2), (4) Date: Jun. 3, 2011

(87) PCT Pub. No.: WO2009/021906
PCT Pub. Date: Feb. 19, 2009

(65) Prior Publication Data
US 2011/0230624 A1 Sep. 22, 2011

(30) Foreign Application Priority Data
Aug. 16, 2007 (DE) .................. 10 2007 038 439

(51) Int. Cl.
C08C 19/25 (2006.01)
C08C 19/44 (2006.01)
C08C 19/34 (2006.01)
C08K 5/5415 (2006.01)
C08J 3/24 (2006.01)
B60C 1/00 (2006.01)
C08K 3/04 (2006.01)
C08F 4/52 (2006.01)

(52) U.S. Cl.
CPC . *C08C 19/44* (2013.01); *B60C 1/00* (2013.01); *C08C 19/25* (2013.01); *C08C 19/34* (2013.01); *C08J 3/24* (2013.01); *C08K 3/04* (2013.01); *C08K 5/5415* (2013.01); *C08F 4/52* (2013.01)

(58) Field of Classification Search
CPC ........ C08C 19/25; C08C 19/30; C08C 19/34; C08C 19/44; C08J 3/24; C08K 5/5415; C08F 4/52
USPC .................. 525/331.9, 333.1, 333.2, 342
See application file for complete search history.

(56) References Cited

U.S. PATENT DOCUMENTS

| | | | |
|---|---|---|---|
| 4,503,204 A | 3/1985 | Bingham et al. | |
| 4,906,706 A | 3/1990 | Hattori et al. | |
| 6,136,921 A | 10/2000 | Hsieh et al. | |
| 6,300,450 B1 | 10/2001 | Tsujimoto et al. | |
| 6,383,971 B1 | 5/2002 | Windisch | |
| 6,399,726 B1 | 6/2002 | Windisch et al. | |
| 6,492,476 B1 | 12/2002 | Knauf et al. | |
| 6,734,257 B2 | 5/2004 | Windisch et al. | |
| 6,992,147 B1 * | 1/2006 | Ozawa et al. | 525/342 |
| 2005/0137338 A1 | 6/2005 | Halasa et al. | |

FOREIGN PATENT DOCUMENTS

| | | |
|---|---|---|
| EP | 0011184 B1 | 11/1983 |
| EP | 0930318 B1 | 4/2003 |
| EP | 0890580 B1 | 9/2003 |
| WO | 01/34658 A1 | 5/2001 |

OTHER PUBLICATIONS

International Search Report from co-pending Application PCT/EP2008/060416 dated Jan. 27, 2009, 2 pages.

* cited by examiner

Primary Examiner — Roberto Rabago

(57) ABSTRACT

The present invention relates to nano-structured diene polymers and their preparation and to their use.

3 Claims, 3 Drawing Sheets

NANOSTRUCTED POLYMERS ON THE BASIS OF CONJUGATED DIENES

TECHNICAL FIELD

The present invention relates to nano-structured diene polymers and their preparation and to their use.

BACKGROUND INFORMATION

A special method used in tyre construction links living, in part alkali-metal-terminated, polymers based on conjugated dienes or based on conjugated dienes and on vinylaromatic compounds to organic or inorganic compounds particularly suitable for this purpose, thus improving processing properties in particular, and also physical and dynamic properties, in particular those connected with rolling resistance in tyres.

The linking/coupling agents used for the rubbers mentioned in the industry comprise not only a very wide variety of organic compounds having appropriate groups capable of linkage to the living polymers, e.g. epoxy groups (German Auslegeschrift 19 857 768), isocyanate groups, aldehyde groups, keto groups, ester groups, and halide groups, but especially also appropriate compounds of silicon or of tin (EP-A 0 890 580 and EP-A 0 930 318), for example their halides, sulphides or amines. German Auslegeschrift 19 803 039 describes rubber compositions for high-performance tyre treads, the underlying rubbers of which have to some extent been coupled with tin compounds, phosphorus compounds, gallium compounds or silicon compounds.

There are also various known methods for end-group functionalization of polydienes. In the case of polybutadiene catalyzed via neodymium-containing systems, examples of compounds used are epoxides, substituted keto compounds from the group of ketones, aldehydes or acid derivatives, or substituted isocyanates, as described by way of example in U.S. Pat. No. 4,906,706. Another known method of end-group modification uses doubly functionalized reagents. These react with the polydiene, using the polar functional group, and use a second polar functional group in the molecule to interact with the filler, as described by way of example in WO 01/34658 or U.S. Pat. No. 6,992,147.

Some of the linking agents used hitherto have considerable disadvantages, for example leading to end-group modification in diene polymerization reactions catalyzed via rare earths, in particular via neodymium-containing systems, thus being unsuitable as coupling agents.

SUMMARY

It was therefore an object of the present invention to provide nano-structured diene polymers which have good processing performance and, by virtue of their nano-structured polymer fraction, have an improved property profile in compounded rubber materials.

DETAILED DESCRIPTION

Figure 1:
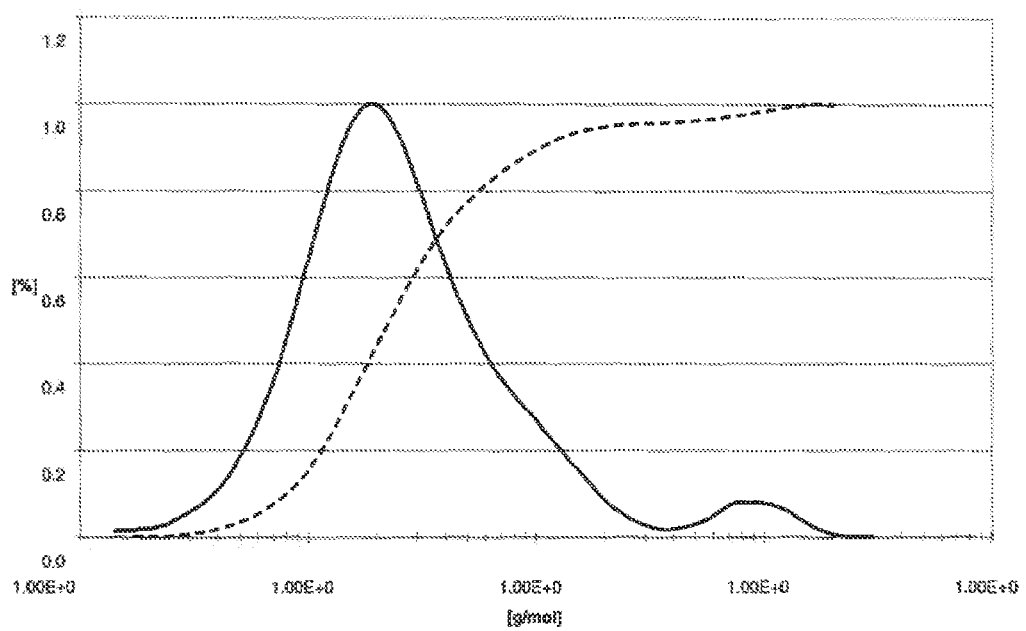
FIG. 1 is a graphical representation of the relative fraction of the polymers in relation to the molecular weight in g/mol according to Example 2.

The present invention provides nano-structured polymers based on conjugated dienes, obtainable via polymerization of conjugated dienes with catalysts of the rare earths and subsequent reaction with a nano-coupling agent, where the resultant polymers have bimodal molar mass distribution in which the high-molecular-weight fraction has an average molar mass greater than 2 000 000 g/mol, preferably greater than 5 000 000 g/mol, the amount of the high-molecular-weight fractions, based on the entire polymer, is in the range from 1% to 20%, preferably from 3 to 15%, and the gel content of the entire polymers is <1% and the content of 1,2-vinyl units, based on the polymer, is from 0.3 to 1% by weight.

Conjugated dienes that can be used are any of the known dienes conventional for the preparation of corresponding polymer anions. The following may be mentioned by way of example: 1,3-butadiene, 2,3-dimethyl-1,3-butadiene, 3-butyl-1,3-octadiene, isoprene, piperylene, 1,3-hexadiene, 1,3-octadiene and/or 2-phenyl-1,3-butadiene, preferably 1,3-butadiene and isoprene, and mixtures of the same.

Catalysts used here are preferably compounds of the rare earth metals, as described in more detail by way of example in EP-B 011184 or EP-A 1245600. Any of the Ziegler-Natta catalysts known for polymerization processes can also be used, examples being those based on titanium compounds, on cobalt compounds, on vanadium compounds or on nickel compounds, and also those based on compounds of the rare earth metals. The Ziegler-Natta catalysts mentioned can be used either individually or else in a mixture with one another.

It is preferable that Ziegler-Natta catalysts based on compounds of the rare earth metals are used, examples being cerium compounds, lanthanum compounds, praseodymium compounds, gadolinium compounds or neodymium compounds, where these are soluble in hydrocarbons. The corresponding salts of the rare earth metals are particularly preferably used as Ziegler-Natta catalysts, examples being neodymium carboxylates, in particular neodymium neodecanoate, neodymium octanoate, neodymium naphthenate, neodymium 2,2-diethylhexanoate, or neodymium 2,2-diethylheptanoate, and the corresponding salts of lanthanum or of praseodymium. The Ziegler-Natta catalysts that can be used also encompass catalyst systems based on metallocenes, e.g. described in the following references: EP-A 919 574, EP-A 1025136 and EP-A 1078939.

Nano-coupling agents used comprise compounds which react with the polymers, to some extent coupling onto the polymer, and which form nano-structures in a downstream reaction, where the average molar mass of the said nanoparticles becomes increased at least by a factor of 5, preferably by a factor of 7.

Preferred nano-coupling agents are oligomeric silicates of the formula $$X_3\text{—Si—}(O\text{—}SiX_2)_n\text{—}X,$$

where

X is an alcoholate of the formula OR, where R is a saturated or to some extent unsaturated aliphatic hydrocarbon radical having from 1 to 30 carbon atoms, a cycloaliphatic hydrocarbon radical having from 5 to 30 carbon atoms or an aromatic hydrocarbon radical having from 6 to 30 carbon atoms and n is a number greater than 0, preferably greater than 1 and particularly preferably greater than 2.

Examples of preferred nano-coupling agents of the type mentioned are

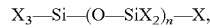
(RO)$_3$Si—O—Si(OR)$_3$,

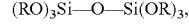
(RO)$_3$Si—O—Si(OR)$_2$—O—Si(OR)$_3$,

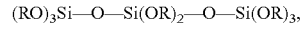
(RO)$_3$Si—O—Si(OR)$_2$—O—Si(OR)$_2$—O—Si(OR)$_3$,

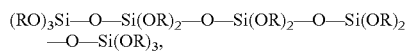

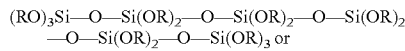

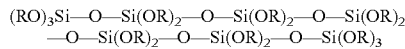

where R is methyl, ethyl, vinyl, propyl, isopropyl, butyl, pentyl, hexyl, octyl or their isomers. These oligomeric silicates are commercially available and are preferably formed via condensation of silicon tetraalcoholates, and can be defined compounds or mixtures of compounds having a different degree of condensation.

Oligomeric silicates are obtainable by way of example with the trade mark Dynasil® 40 from Degussa.

Less suitable compounds are those which contain groups having acidic hydrogen, for example the hydrogen present in NH groups, in OH groups or in COOH groups.

The amount of the nano-coupling agents used depends on the desired degree of modification. The ratio of nano-coupling agent to polymers is preferably in the range from 0.001 to 10 g:100 g, in particular from 0.01 to 6 g:100 g.

The reaction to form the said nano-structures can take place in one or more stages. It is particularly preferable that the nano-coupling agent becomes coupled in a first reaction to the living polymer group, and that, in a second stage used in combination with other modified polymer groups, it undergoes agglomeration to give the nano-structures described.

The agglomeration process preferably takes place during the work-up of the polymer, for example during the stripping process, when the polymer by way of example comes into contact with water. In one preferred embodiment, the nano-coupling agents can react with one another at this point. That can by way of example take place in that the free groups of the nano-coupling agents, to which no polymer groups have been bonded, react with one another and thus bond two or more nano-coupling agents to one another, where each of these in turn may bear one or more polymer groups.

The invention also provides a process for the preparation of nano-structured polymers based on conjugated dienes, characterized in that conjugated dienes are first polymerized in the presence of an inert organic, aprotic solvents and in the presence of a catalyst of the rare earths, and the polymers obtained after the polymerization reaction, based on the monomers mentioned, are reacted with nano-coupling agents of the formula

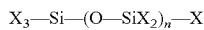

where

X is an alcoholate of the formula OR, where R is a saturated or to some extent unsaturated aliphatic hydrocarbon radical having from 1 to 30 carbon atoms, a cycloaliphatic hydrocarbon radical having from 5 to 30 carbon atoms or an aromatic hydrocarbon radical having from 6 to 30 carbon atoms and n is a number greater than 0, preferably greater than 1 and particularly preferably greater than 2, and the amount of the nano-coupling agents used in relation to polymers is in the range from 0.001 to 10 g:100 g.

In the inventive process, the nano-coupling agent reacts with the polymers, in that the nano-coupling agent first modifies the end group of the living polymer and then, in a subsequent stage, the nano-coupling agent condenses to give relatively high-molecular-weight structures.

The inventive nano-structured polymers are prepared in successive steps. First, the polydiene is prepared, and this is then reacted with one or more of the nano-coupling agents defined above, which can then react by way of example with condensation to give nano-structured polymers. These nano-coupling agents can be added at any desired juncture of the polymerization reaction, as a function of the properties desired in the polymers to be prepared.

The conduct in the polymerization of the conjugated dienes is generally such that a catalyst system is reacted with the respective diene in order to form the diene polymers.

The polymerization of the conjugated dienes is preferably carried out (see EP-B 011184 or EP-A 1245600) in the presence of the abovementioned Ziegler-Natta catalysts, in accordance with familiar methods.

The inventive process is preferably carried out in the presence of inert, aprotic solvents. These inert aprotic solvents can be paraffinic hydrocarbons, e.g. isomeric pentanes, hexanes, heptanes, octanes, decanes, 2,4-trimethylpentane, cyclopentane, cyclohexane, methylcyclohexane, ethylcyclohexane or 1,4-dimethylcyclohexane, or aromatic hydrocarbons, such as benzene, toluene, ethylbenzene, xylene, diethylbenzene or propylbenzene. These solvents can be used individually or in combination. Cyclohexane and n-hexane are preferred.

The amount of solvents can vary widely. It is usually from about 300 to 1500 parts by weight per 100 parts by weight of all of the monomers.

The polymerization temperature can vary widely and is generally in the range from 0° C. to 200° C., preferably from 40° C. to 130° C. The reaction time likewise varies widely from a few minutes to a few hours. The polymerization reaction is generally carried out within a period of from about 30 minutes to 8 hours, preferably from 1 to 4 hours. It can be carried out either at atmospheric pressure or else at elevated pressure (from 1 to 10 bar).

The inventive polymers can be prepared either batchwise or else continuously. Preference is given to the continuous procedure in a reactor cascade composed of a plurality of reactors in series, preferably at least 2, in particular from 2 to 5.

The polymerization preferably continues as far as complete conversion of the dienes used. It is, of course, also possible to interrupt the diene polymerization reaction prematurely as a function of the desired properties of the polymer, for example at about 80% conversion of the monomers. After the diene polymerization reaction, the unconverted diene can by way of example be isolated via depressurization and distillation (a flash stage).

For the reaction with the nano-coupling agent, the polymerization mixture obtained during the polymerization reaction is mixed with the nano-coupling agents mentioned.

The solvent or solvent mixture used for this is preferably the same aprotic organic solvent or solvent mixture also used for preparation of the diene polymers. It is, of course, also possible to change the solvent or to add the nano-coupling agent in another solvent. Examples of aprotic organic solvents that can be used are: pentanes, hexanes, heptanes, cyclohexane, methylcyclopentane, benzene, toluene, ethylbenzene, preferably hexanes, cyclohexane, toluene, very particularly preferably hexane. It is moreover also possible to add polar organic compounds which can by way of example serve as solvents for the nano-coupling agent.

During the reaction, care has to be taken that disruptive compounds which could impair the coupling of the nano-coupling agent to the polymer are preferably excluded. Examples of such disruptive compounds are carbon dioxide, oxygen, water, alcohols, organic and inorganic acids.

The reaction of the diene polymers with the nano-coupling agents is preferably carried out in situ without intermediate isolation of the polymers, and the diene polymers here are reacted with the nano-coupling agents after the polymerization reaction, if appropriate via the depressurization and distillation process (flash stage), without further intermediate treatment.

The amount of the nano-coupling agents used depends on their desired degree of modification. The ratio of nano-coupling agent to polymers is preferably in the range from 0.001 to 10 g:100 g, in particular from 0.01 to 6 g:100 g.

The reaction with the nano-coupling agent is usually carried out at temperatures approximately corresponding to the temperatures for the polymerization reaction. This means that the reaction is carried out at temperatures of from about 0° C. to 200° C., preferably from 40° C. to 130° C. The reaction can likewise be carried out at atmospheric pressure or else at elevated pressure (from 1 to 10 bar).

The reaction time is preferably relatively short. It is in the range from about 1 minute to about 1 hour.

After the reaction with the nano-coupling agents, the polymers, now end group-modified, are bonded to give nano-structures, in that the reaction mixture is preferably brought into contact with water. This can take place via separate addition of water to the polymer solution, or via introduction of water vapour during the stripping process. Additionally, it is also possible to add other protic reagents with or prior to the addition of the water, examples being alcohols or carboxylic acids. It is moreover advantageous that antioxidants are added to the reaction mixture before the nano-structured polymer is isolated.

It is moreover possible to use a known method for isolation, purification and then work-up of the polymers obtained in the presence of the Ziegler-Natta catalysts and reacted with the nano-coupling agents.

The inventive polymer can be isolated in a known manner, for example via steam distillation or flocculation using a suitable flocculating agent, such as alcohols. The flocculated polymer is then by way of example removed from the resultant fluid by centrifuging or extrusion. Residual solvent and other volatile constituents can be removed from the isolated polymer via heating, if appropriate at reduced pressure or in a stream of air from a blower.

The molecular weight of the inventive nano-structured polymers can vary widely. For the conventional applications of the inventive polymers, the number-average molar mass (Mn) of the entire polymer is in the range from about 100 000 to about 500 000 g/mol, where the molecular weight has bimodal distribution, and where the high-molar-mass fraction is greater than the low-molar-mass fraction in the average molar mass at least by a factor of 5, preferably by a factor of 8, and particularly preferably by a factor of 10, and the high-molar-mass fraction has an average molar mass greater than 2 000 000 g/mol, preferably greater than 5 000 000 g/mol, in GPC analysis. The amount of the high-molecular-weight fractions, based on the entire polymer, is in the range from 1% to 20%, preferably from 3 to 15%.

Figure 2:
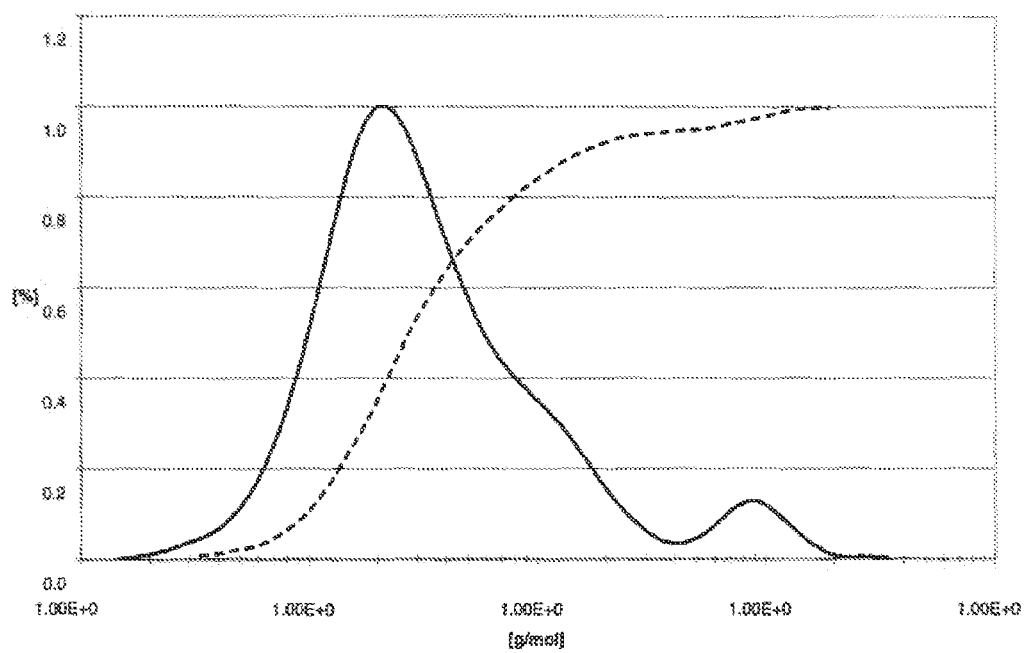
FIG. 2 is a graphical representation of the relative fraction of the polymers in relation to the molecular weight in g/mol according to Example 4.

The invention is explained in more detail using FIGS. 1 and 2. These show the relative fraction of the polymers in relation to the molecular weight in g/mol. The continuous line describes the molecular weight distribution plotted against the molecular weight. The broken line is the associated integral. The two graphs using Examples 2 (FIG. 1) and 4 (FIG. 2) show very clearly the bimodality of the inventive polymers after the coupling reaction. The bimodality is apparent in the molecular weight distribution via two separate peaks, separated from each other by a minimum. The integral separates the two peaks in a manner corresponding to the molecular weight distribution, via an inflection in the curve. This becomes particularly clear in comparison with FIG. 3, which shows the curve for the comparative polymer without nano-coupling agent. In this example, the molecular weight distribution shows only one peak and the integral rises continuously, and no bimodality is therefore present.

It can also be seen that, after the coupling reaction, the high-molar mass peak lies markedly above the threshold of 2 000 000 g/mol, with molar masses above 5 000 000 g/mol.

The solubility behaviour of the inventive nano-structured polymer is the same as that of an unmodified polymer. The gel content of the polymer is below 1%. The content of 1,2 bonds (vinyl content) in the inventive polymers is preferably from 0.3 to 1% by weight, preferably from 0.4 to 0.8% by weight.

The usual compounding components can, of course, also be added to the inventive polymers, examples being fillers, dye, pigments, softening agents and reinforcing agents. The known rubber auxiliaries and crosslinking agents can also be added.

The inventive nano-structured polymers can be used in a known manner for the production of vulcanisates or of rubber mouldings of any type.

When the inventive nano-structured polymers were used in tyre mixtures, it was possible to obtain a marked improvement in the dynamic properties of the compounded material.

The invention moreover provides the use of the inventive nano-structured polymers for the production of tyres and of tyre components, of golf balls and of technical rubber items, and also of rubber-reinforced plastics, e.g. ABS plastics and HIPS plastics.

The examples and figures below serve to illustrate the invention, without any resultant limiting effect.

EXAMPLES

The polymerization reactions were carried out with the exclusion of air and moisture, under nitrogen. The solvent used comprised dry, oxygen-free technical-grade hexane. The polymerization reaction was carried out in an autoclave of volume from 2 l to 20 l, corresponding to the size of the batch.

Conversions were determined gravimetrically; the polymer solutions here were weighed after the specimen had been taken (still with solvent and monomer) and after drying (at 65° C. in a vacuum drying cabinet).

The Mooney ML 1+4 (100) measurement was made on equipment from Alpha using the large rotor, after one minute of preheating, over 4 min. at 100° C.

Inventive Examples 1-5

A solution of diisobutylaluminium hydride in hexane (DIBAH; Al($C_4H_9$)$_2$H) and a solution of ethylaluminium sesquichloride in hexane (EASC, Al$_2$($C_2H_5$)$_3$Cl$_3$) in equimolar amount with respect to neodymium versatate, and a solution of neodymium versatate in hexane (NdV, Nd($O_2C_{10}H_{19}$)$_3$) were added to a solution of 13% by weight of 1,3-butadiene in technical-grade hexane in a dried 20 l steel reactor under nitrogen, with stirring. The mixture is then heated to an initial feed temperature of 73° C. The reaction is terminated 60 min after the start of the reaction, and a polymer specimen is taken. The modification reagent with 100 mL of hexane is then added by way of a burette, with stirring.

Table 1 states the amounts used, the nano-coupling agent used and the Mooney values of the individual polymer specimens prior to and after coupling.

After one hour of reaction time, the reaction is stopped by adding 20 mL of water, and the mixture is stabilized with 2.6 g of Irganox 1520L dissolved in 100 mL of hexane.

In Inventive Example 1, the polymer is then precipitated with about 10 L of aqueous ethanol and dried at 60° C. in a vacuum drying cabinet.

In Inventive Examples 2 to 5, the polymer is worked up in a laboratory stripper and dried at 60° C. in a vacuum drying cabinet.

TABLE 1

| Example | 1 | 2 | 3 | 4 | 5 |
|---|---|---|---|---|---|
| Hexane [g] | 1480 | 8500 | 8500 | 8500 | 8500 |
| 1,3-Butadiene [g] | 250 | 1300 | 1300 | 1300 | 1300 |
| DIBAH 20% [ml] | 4.0 | 21.6 | 21.6 | 21.6 | 21.6 |
| EASC 20% [ml] | 0.6 | 2.5 | 2.5 | 2.5 | 2.5 |
| NdV 8.8% [ml] | 0.6 | 2.8 | 2.8 | 2.8 | 2.8 |
| Dynasil 40 [g] | 0.2 | 13 | 26 | 39 | 65 |
| Prior to coupling | | | | | |
| ML 1 + 4 (100) [MU] | 25 | 32 | 33 | 34 | 35 |
| ML, 30 s relaxation [%] | | 4.4 | 5.4 | 5.4 | 5.4 |
| Mn [g/mol] | | 169500 | 144900 | 132200 | |
| Mw [g/mol] | | 495400 | 430200 | 485800 | |
| Mz [g/mol] | | 1778000 | 1329000 | 1657000 | |
| After coupling | | | | | |
| ML 1 + 4 (100) [MU] | 32 | 39 | 44 | 44 | 50 |
| ML 30 s relaxation [%] | | 6.0 | 8.2 | 9.4 | 8.1 |
| Mn [g/mol] | | 179700 | 164500 | 202700 | |
| Mw [g/mol] | | 803400 | 701900 | 932500 | |
| Mz [g/mol] | | 4087000 | 5798000 | 6478000 | |

Dynasil 40: Ethyl polysilicate (silicic ester) from Degussa, $(OEt)_3$-Si—(O—Si(OEt)$_2$)$_n$-OEt, where $n$=from 2 to 3, $SiO_2$ content=40-42%

The inventive polymers feature a sharp rise in Mooney viscosity after coupling, and this unambiguously confirms the rise in molecular weight shown by way of example in FIGS. 1 and 2 for Inventive Examples 2 and 4.

FIGS. 1 and 2 show the relative fraction of the polymers in relation to the molar mass in g/mol.

FIG. 1 shows the molecular weight distribution in Inventive Example 2 after coupling, and FIG. 2 shows the molecular weight distribution in Inventive Example 4 after coupling.

The two graphs very clearly show the bimodality (continuous line). It can also be seen that the high-molar-mass peak begins at molar masses above 3 000 000 g/mol and, with average molar masses above 5 000 000 g/mol, lies markedly above the threshold of 2 000 000 g/mol (broken line).

Comparative Examples 6 and 7

Figure 3:
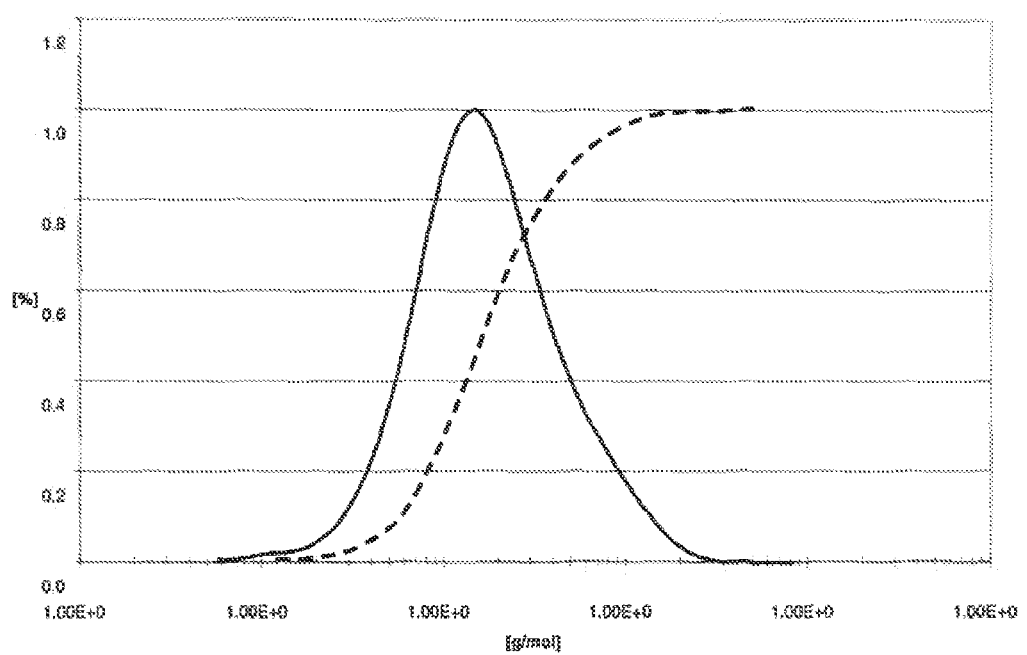
FIG. 3 is a graphical representation of the relative fraction of the polymers in relation to the molecular weight in g/mol without a nano-coupling agent.

Comparative Examples 6 and 7 were carried out as described in Inventive Example 2. Instead of the nano-coupling agent, $SiCl_4$ was used as modifying agent. The polymer exhibited no Mooney rise after modification. In both examples, after modification, the Mooney relaxation values after 30 sec were in the range of the non-coupled polymers, with below 5%. The molecular weight exhibits no bimodality after the reaction with $SiCl_4$. FIG. 3 shows the molecular weight distribution in Comparative Example 7 after the reaction with $SiCl_4$. $SiCl_4$ exhibited no activity as nano-coupling agent.

TABLE 2

| Comparative example | 6 | 7 |
|---|---|---|
| Hexane [g] | 8500 | 8500 |
| 1,3-Butadiene [g] | 1300 | 1300 |
| DIBAH 20% [ml] | 21.6 | 21.6 |
| EASC 20% [ml] | 2.5 | 2.5 |
| NdV 8.8% [ml] | 2.8 | 2.8 |
| $SiCl_4$ [g] | 13 | 39 |
| Prior to coupling | | |
| ML 1 + 4 (100) [MU] | 29 | 28 |
| ML 30 s relaxation [%] | 6.3 | 6.3 |
| After coupling | | |
| ML 1 + 4 (100) [MU] | 30 | 29 |
| ML 30 s relaxation [%] | 4.5 | 4.8 |

Comparative Example 8

Inventive Examples 9 to 10

For Comparative Example 8, Buna™ CB24 from Lanxess Deutschland GmbH was used. For Inventive Examples 9 and 10, the polymers of Examples 2 and 5 were used.

For comparable Mooney viscosity of the compounded materials, it was possible to improve the tear-propagation resistance considerably in the Inventive Examples 9 and 10 in comparison with the Comparative Example 8.

| Mixture studies used the following stubstances: | |
|---|---|
| Trademark | Producer |
| Buna ™ CB24, as non-functionalized polybutadiene | Lanxess Deutschland GmbH |
| Ultrasil 7000 GR, as silica | KMF Laborchernie Handels GmbH |
| Si 69, as silane | Degussa Hüls AG |
| Corax N 234, as carbon black | KMF Laborchemie Handels GmbH |
| Enerthene 1849-1, as oil | BP Oil Deutschland GmbH |
| Rotsiegel zinc white, as zinc oxide | Grille Zinkoxid GmbH |
| EDENOR C 18 98-100 (stearic acid) | Cognis Deutschland GmbH |
| Vulkanox ® 4020/LG, as stabilizer | Bayer AG Brunsbüttel |
| Vulkanox ® HS/LG, as stabilizer | Bayer Elastomeres S.A. |
| Vulkacit ® CZ/C, as rubber chemical | Bayer AG Antwerp |
| Vulkacit ® D/C, as rubber chemical | Bayer AG Leverkusen |
| Ground sulphur 90/95 Chancel | Deutsche Solvay-Werke |

TABLE 3

| | Comparative example* | | |
|---|---|---|---|
| Inventive example | 8* | 9 | 10 |
| Buna ® CB 24 | 100 | | |
| Inventive Example 2 | | 100 | |
| Inventive Example 5 | | | 100 |
| Carbon black (IRB 7, (N330)) | 60 | 60 | 60 |
| EDENOR C 18 98-100 | 2 | 2 | 2 |
| Enerthene 1849-1 | 15 | 15 | 15 |
| Vulkazit ® NZ/EGC | 0.9 | 0.9 | 0.9 |
| Ground sulphur, 90/95 Chancel | 1.5 | 1.5 | 1.5 |
| Zinc oxide (IRM 91, from U.S. Zinc) | 3 | 3 | 3 |
| Mooney ML 1 + 4 100° C. | | | |
| ML 1 + 4 [MU] | 79 | 71 | 81 |
| MDR (160° C., 30 min) | | | |
| S' min [dNm] | 3.24 | 3.09 | 3.5 |
| S' max [dNm] | 20.9 | 17.85 | 17.76 |

TABLE 3-continued

| Inventive example | Comparative example* | | |
|---|---|---|---|
| | 8* | 9 | 10 |
| t 10 [s] | 239 | 253 | 243 |
| t 95 [s] | 777 | 775 | 772 |
| Test specimen: Graves DIN 53515 | | | |
| Median tear-propagation resistance [N/mm] | 33 | 72 | 65 |

What is claimed is:

1. A polymer obtained by polymerization of a conjugated diene with a catalyst of the rare earths, whereby an intermediate polymer is formed and subsequently reacted with an oligomeric silicates of the formula $X_3$—Si—(O—SiX$_2$)$_n$—X, where X is an alcoholate of the formula OR, R is a saturated or partially unsaturated aliphatic hydrocarbon radical having from 1 to 30 carbon atoms, a cycloaliphatic hydrocarbon radical having from 5 to 30 carbon atoms, or an aromatic hydrocarbon radical having from 6 to 30 carbon atoms, and n is a number greater than 0, thereby forming the polymer, wherein the polymer has a bimodal molar mass distribution comprising a high molecular-weight fraction and a low molecular-weight fraction, wherein the high-molecular-weight fraction has a number average molar mass ($M_n$) greater than 2,000,000 g/mol, the amount of the high-molecular-weightfraction, based on the polymer, is in the range from 1% to 20%, and the content of 1,2-vinyl units, based on the polymer, is from 0.3 to 1% by weight.

2. The polymer according to claim 1, wherein the conjugated diene comprises 1,3-butadiene, 2,3-dimethyl-1,3-butadiene, 3-butyl-1,3-octadiene, isoprene, piperylene, 1,3-hexadiene, 1,3-octadiene and/or 2-phenyl-1,3-butadiene.

3. A process comprising:

polymerizing a conjugated diene in the presence of an inert organic, aprotic solvent and in the presence of a catalyst of the rare earths, whereby an intermediate polymer is obtained, reacting the intermediate polymer with an oligomeric silicate of the formula $X_3$—Si—(O—SiX$_2$)$_n$—X, where X is an alcoholate of the formula OR, R is a saturated or partially unsaturated aliphatic hydrocarbon radical having from 1 to 30 carbon atoms, a cycloaliphatic hydrocarbon radical having from 5 to 30 carbon atoms or an aromatic hydrocarbon radical having from 6 to 30 carbon atoms, and n is a number greater than 0, and wherein the amount of the oligomeric silicate used in relation to polymers is in the range from 0.001 to 10 g:100 g.

* * * * *